US012595005B2

(12) United States Patent
Lindberg et al.

(10) Patent No.: US 12,595,005 B2
(45) Date of Patent: Apr. 7, 2026

(54) MODULAR AND SCALABLE ACTIVE REAR DIFFUSOR

(71) Applicant: Magna Exteriors Inc., Concord (CA)

(72) Inventors: Braendon R. Lindberg, Metamora, MI (US); Martin Robert Matthews, Troy, MI (US)

(73) Assignee: Magna Exteriors Inc., Aurora (CA)

( * ) Notice: Subject to any disclaimer, the term of this patent is extended or adjusted under 35 U.S.C. 154(b) by 412 days.

(21) Appl. No.: 18/028,144

(22) PCT Filed: Oct. 13, 2021

(86) PCT No.: PCT/US2021/054762
§ 371 (c)(1),
(2) Date: Mar. 23, 2023

(87) PCT Pub. No.: WO2022/081692
PCT Pub. Date: Apr. 21, 2022

(65) Prior Publication Data
US 2023/0365202 A1 Nov. 16, 2023

Related U.S. Application Data

(60) Provisional application No. 63/091,085, filed on Oct. 13, 2020.

(51) Int. Cl.
*B62D 35/00* (2006.01)
(52) U.S. Cl.
CPC .................................. *B62D 35/007* (2013.01)

(58) Field of Classification Search
CPC ...... B62D 35/007; B62D 35/02; B62D 37/02; Y02T 10/82; Y02T 10/88
See application file for complete search history.

(56) References Cited

U.S. PATENT DOCUMENTS

| | | | |
|---|---|---|---|
| 3,941,499 A | 3/1976 | Kronogård |
| 3,978,919 A | 9/1976 | Fachbach et al. |
| 4,282,709 A | 8/1981 | Kronogård |
| 4,368,505 A | 1/1983 | Tomforde |
| 9,283,999 B2 | 3/2016 | Wolf |
| 9,868,479 B2 | 1/2018 | Shinedling et al. |
| 10,082,030 B2 | 9/2018 | Genrup et al. |
| 10,781,720 B2 | 9/2020 | French |
| 2014/0097638 A1 | 4/2014 | Froling et al. |
| 2015/0166130 A1 | 6/2015 | Lee et al. |

FOREIGN PATENT DOCUMENTS

| | | |
|---|---|---|
| CN | 210437280 U | 5/2020 |
| CN | 211032789 U | 7/2020 |
| DE | 102015008892 A1 | 3/2016 |

(Continued)

OTHER PUBLICATIONS

Extrudex Extruded Parts Popular in Automotive (Year: 2015).*

(Continued)

*Primary Examiner* — Lori Lyjak

(57) ABSTRACT

An active rear diffuser for a rear portion of a vehicle. The rear diffuser assembly is formed from a set of components that are uniform across all vehicle platforms, with some of the components being scalable and allowing them to be adjusted to an appropriate length without any retooling.

22 Claims, 7 Drawing Sheets

(56)          References Cited

FOREIGN PATENT DOCUMENTS

| | | | |
|---|---|---|---|
| GB | 2578153 | A | 4/2020 |
| JP | 3952063 | B2 | 8/2007 |
| JP | 6294358 | B2 | 3/2018 |
| JP | 6534717 | B2 | 6/2019 |
| KR | 101039830 | B1 | 6/2011 |
| KR | 20150129254 | A | 11/2015 |
| WO | 2016020424 | A1 | 2/2016 |
| WO | 2018100271 | A | 6/2018 |

OTHER PUBLICATIONS

Taking Subjectivity out of Class A Surface Evaluation (Year: 2008).*
Notification of Transmittal of the International Search Report and the Written Opinion of the International Searching Authority for International Application No. PCT/US2021/054762, Mailed Feb. 2, 2022.

* cited by examiner

MODULAR AND SCALABLE ACTIVE REAR DIFFUSOR

CROSS-REFERENCE TO RELATED APPLICATIONS

This application is a National Stage Utility Application under 35 USC 371 claiming priority to PCT International Application PCT/US2021/054762, filed Oct. 13, 2021, claims the benefit of U.S. Provisional Application No. 63/091,085, filed Oct. 13, 2020. The disclosures are incorporated herein by reference.

FIELD OF THE INVENTION

The present invention relates to a scalable and modular concept for an active rear diffusor.

BACKGROUND OF THE INVENTION

The use of air diffusers at the rear of vehicles reduces turbulent wake at the back area of SUV's thereby reducing coefficient of drag (Cd) and improving fuel economy. At the lower rearward region of the vehicle are often fin or cover features that are typically static structures that control air flow past the bottom rear side of the vehicle. Sometimes the cover features are active and will move downward toward the road and sometimes they extend past the rear bumper of the vehicle. One problem with the is that current aero devices are specific to vehicle and require a unique design and unique set of tooling, each change of content or vehicle space requires a new design. It is an object of the invention to create a set of components and a design that allows for the positioning the requires components as needed per vehicle along with the adding or subtracting of functional components to meet various vehicle requirements. It is also desirable to provide a rear diffuser that is able to make the middle rear fascia of the vehicle active, while allowing the bottom and top portion of the fascia to stay static.

SUMMARY OF THE INVENTION

The present invention is directed to an active rear diffuser assembly that is connected behind and adjacent an inside surface of a rear fascia of a vehicle. In a preferred embodiment of the invention the rear fascia has an aperture located below a rear bumper of the vehicle and a cover of the active rear diffuser through the aperture between a stowed and extended position.

The active rear diffuser assembly includes brackets that are used to connect the active rear diffuser to a support member of the vehicle. The support member can be the rear bumper or portion of the frame or chassis. In the preferred embodiment of the invention there are two brackets. Connected to each bracket is a rail and an actuator. Connected to the rail is one of two carriers that is connected to one of the two actuators, where each of the carriers is configured to slide relative to the respective rail. Further provided is a link connected between each actuator and the carrier. The link facilitates the movement of the carrier between the stowed position and the extended position. Connected to each carrier is a base that in some embodiments is made of several sections. In one embodiment of the invention one section is connected between the two carriers. The cover, discussed above, is connected to the base, and provide aerodynamic benefit.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
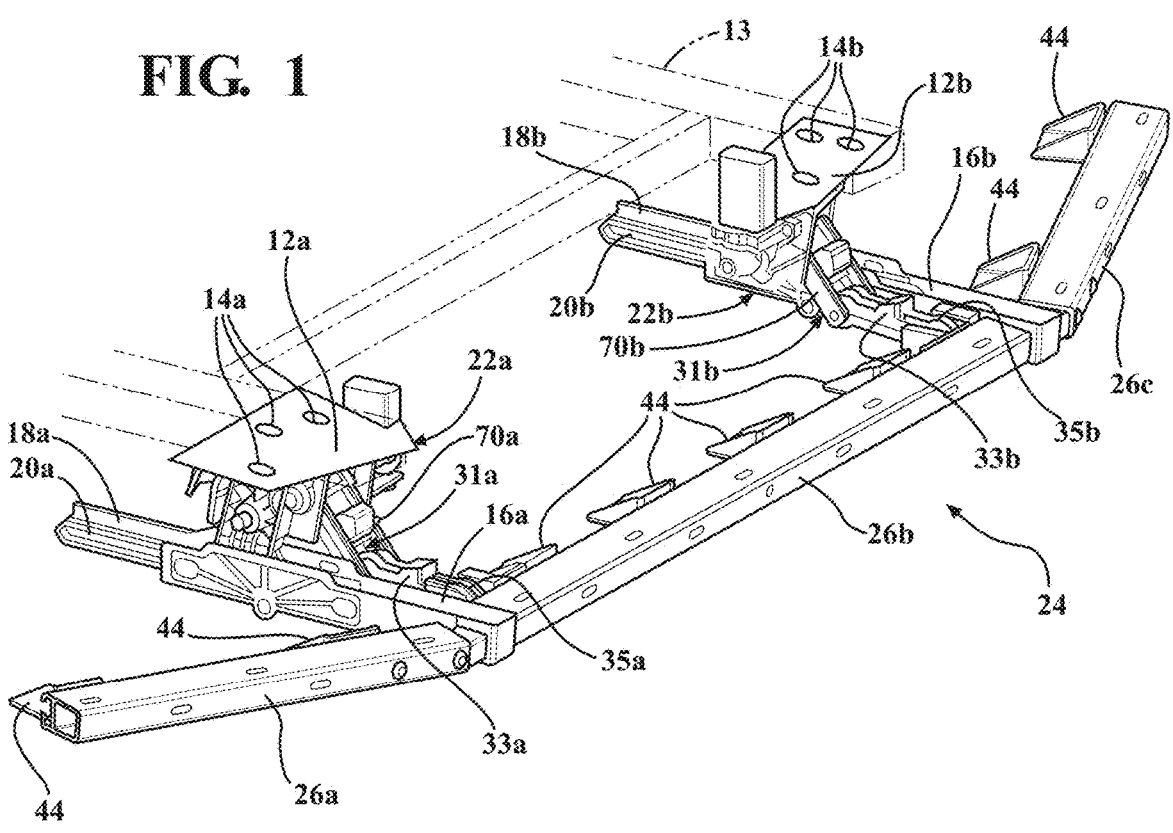
FIG. 1 is a top perspective view of an active rear diffuser assembly with a cover removed according to one embodiment of the invention.

The following description of the preferred embodiment is merely exemplary in nature and is in no way intended to limit the invention, its application, or uses.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring now to the figures, an active rear diffuser assembly 10 for a vehicle is shown. The active rear diffuser assembly 10 actively moves between a stowed position and one or more extended positions. The active rear diffuser assembly 10 includes a brackets 12a, 12b connectable to a support member 13 of a vehicle, such as the vehicle frame, front end module or other suitable structure. The brackets 12a, 12b each include respective mounting holes 14a, 14b for connecting to the support member 13.

Figure 7:
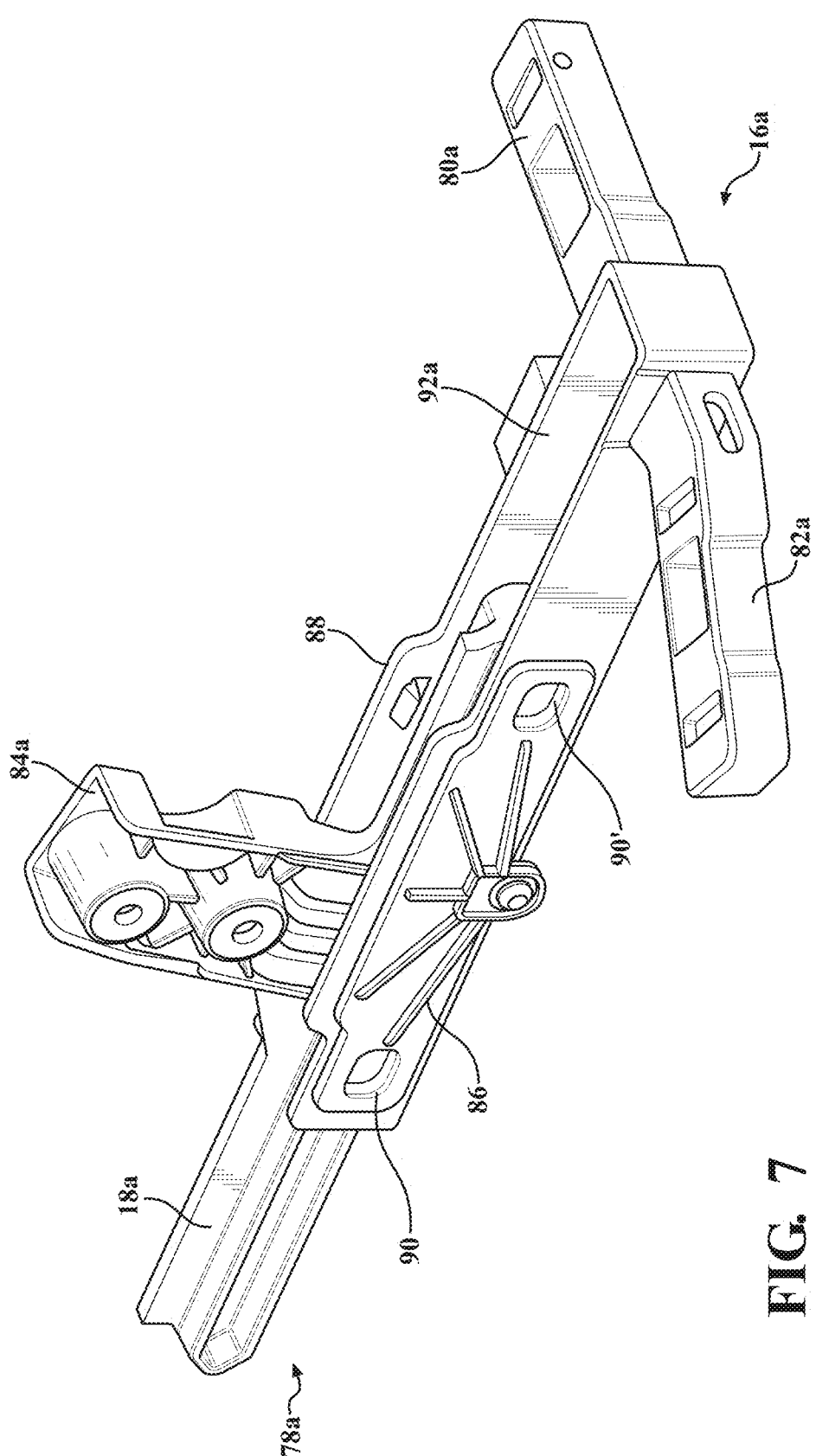
FIG. 7 is a top view of the connections between the carrier, rails, and bracket.
Figure 8:
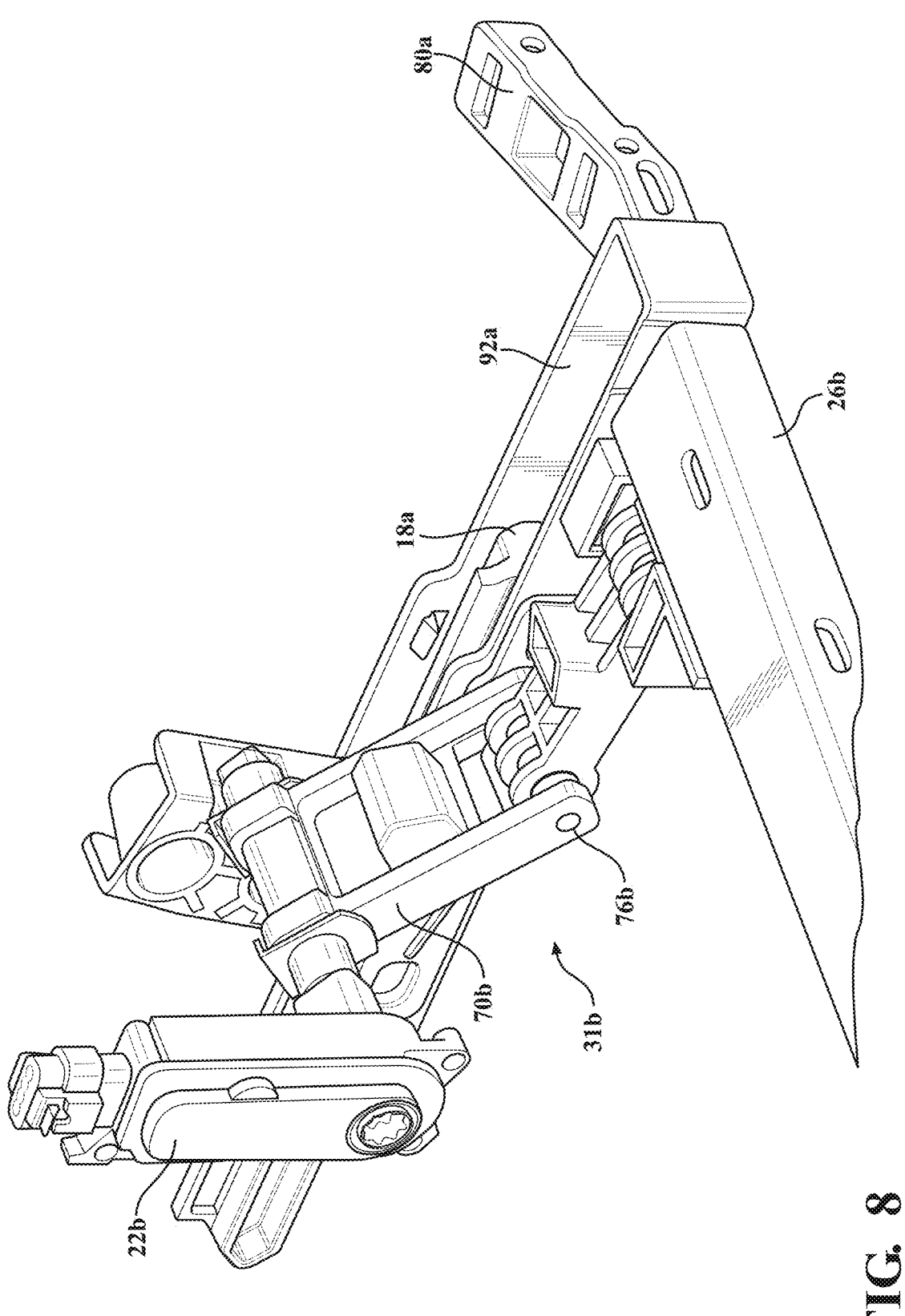
FIG. 8 is a top view of the connections between the carrier, rails, bracket, and actuator.
Figure 9:
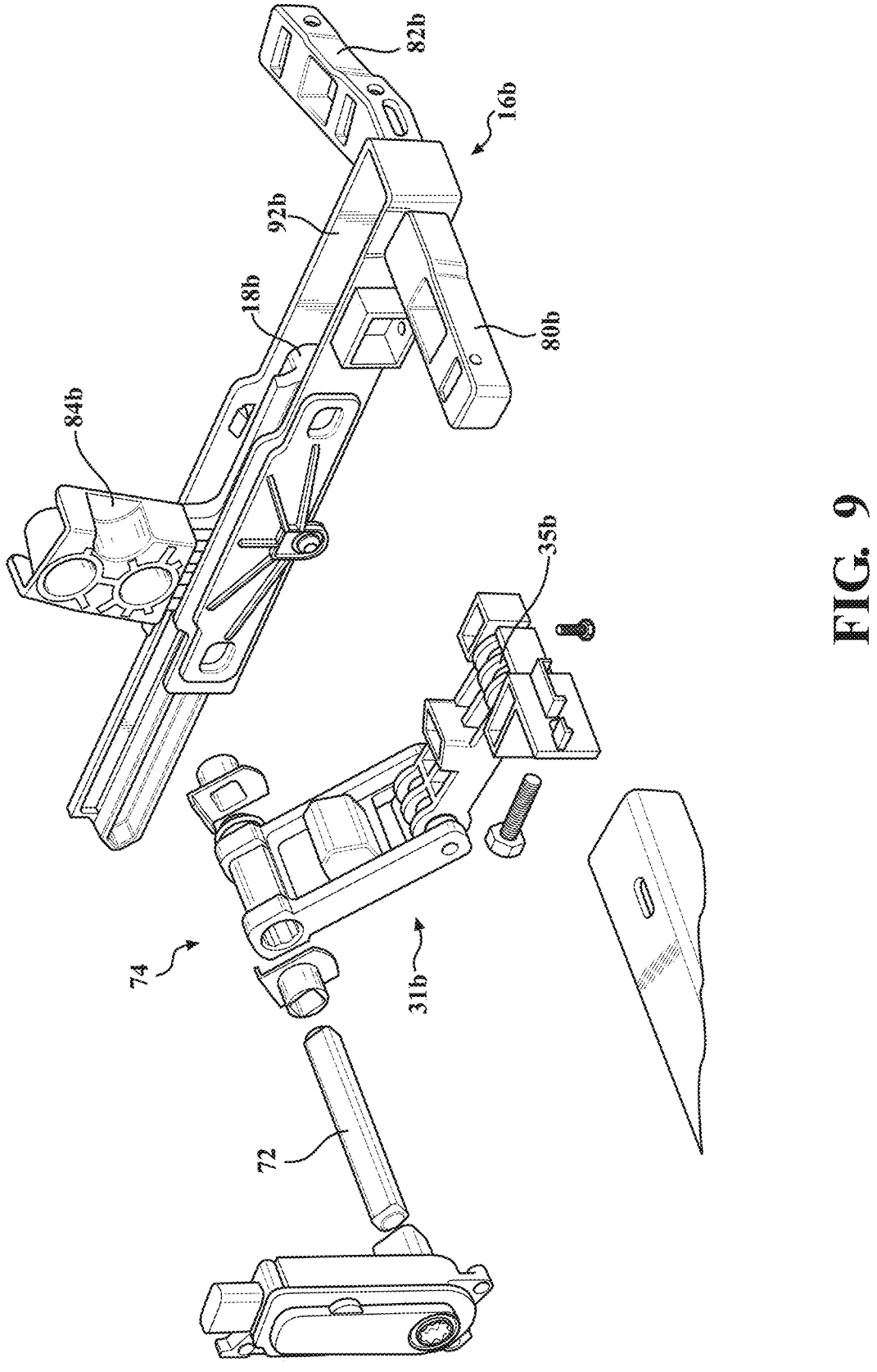
FIG. 9 is an exploded top view of the connections between the carrier, rails, bracket, and actuator.
Figure 10:
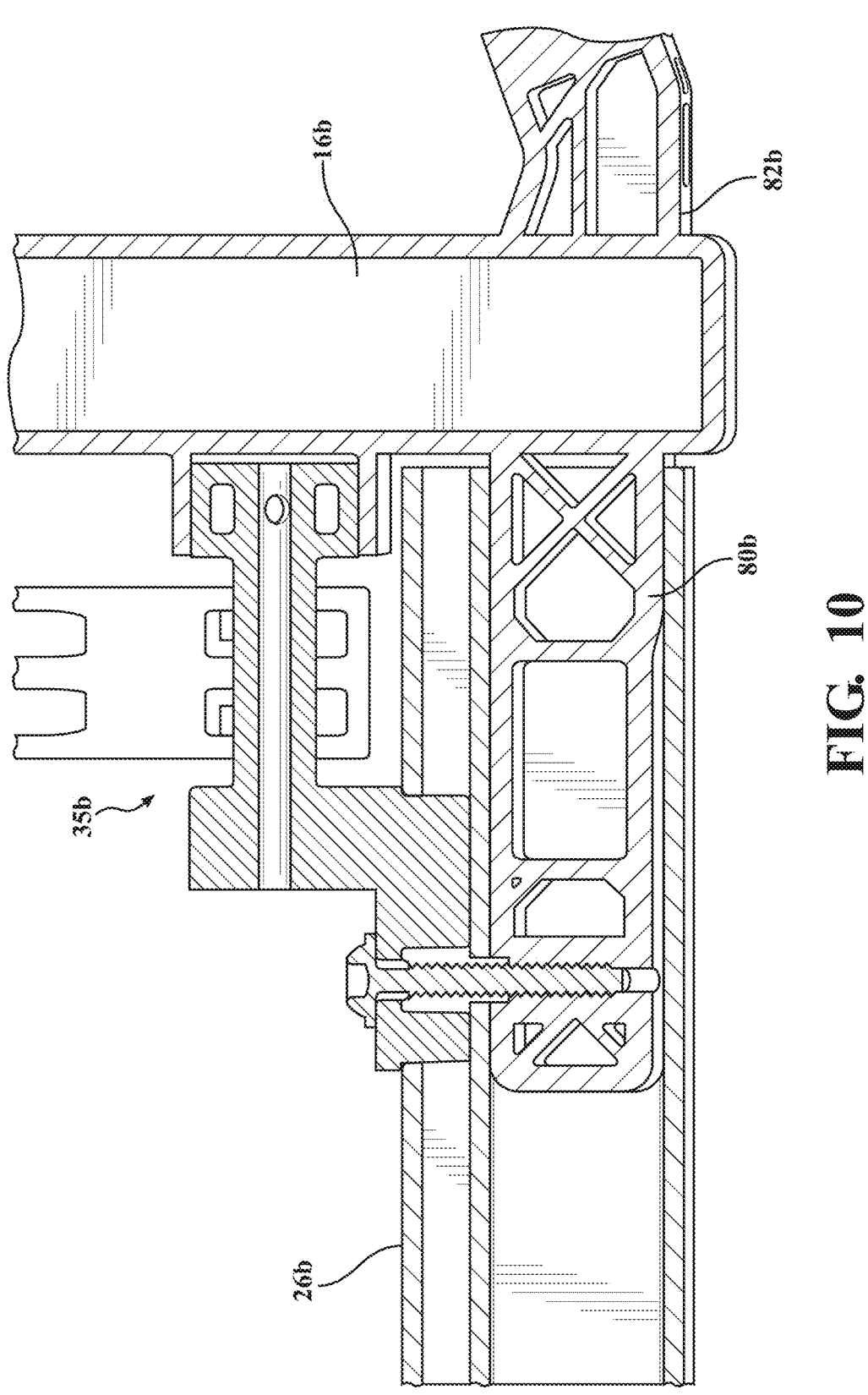
FIG. 10 is a cross-sectional view a portion of the carrier, base and moveable link.

The active rear diffuser assembly 10 further includes two rails 18a, 18b each having one of two tracks 20a, 20b that extend longitudinally. One of two carriers 16a, 16b connect to a respective one of the rails 18a, 18b using a retainer 78a, 78b. The bracket 12a, carrier 16a, rail 18a and retainer 78a are shown on the left side of the active rear diffuser assembly 10 in FIG. 1, while the bracket 12b, carrier 16b, rail 18b and retainer 78b are located is on the right side of FIG. 1. FIGS. 7 and 8 show in greater detail bracket 12a, carrier 16a, rail 18a and retainer 78a, however, it is to be understood that the bracket 12b, carrier 16b, rail 18b and retainer 78b are a mirror image of what is shown in FIGS. 9 and 10.

While the active rear diffuser assembly shows two brackets 12a, 12b, carriers 16a, 16b, rails 18a, 18b and retainers 78a, 78b it is within the scope of this invention for their to be a greater or a smaller number of sets of these components depending on a particular application. For example, a smaller active rear diffuser assembly might only need a single bracket, carrier, rail, retainer, actuator (described below) and link system (described below), or a larger application might require more than two. Therefore, the present invention is not limited to the two sets of components as described herein and it is within the scope of the invention to have a greater or lesser number depending on the needs of a specific application.

Referring now to FIGS. 7-10, the rails 18a, 18b each have a connection leg 84a, 84b that is used to connect the rails 18a, 18b to a respective one of the brackets 12a, 12b in a stationary manner using fasteners. The tracks 20a, 20b of the rails 18a, 18b form a slidable connection between the tracks 20a, 20b and a respective one of the carriers 16a, 16b that is accomplished by connecting the respective one of the retainers 78a, 78b to the carriers 16a, 16b and rails 18a, 18b. As best shown in FIG. 7 the retainer 78a has a first plate 86 that connects to a second plate 88 that has two posts 90 positioned in the track 20a allowing the retainer 78a to slide with the carrier 16a along the track 20a of the rail 18a, between the stowed position and the extended position. The carriers 16a, 16b both include a channel portion 92a, 92b formed on the respective one of the carriers 16a, 16b for receiving at least a portion of the respective one of the rails 18a, 18b when the carriers 16a, 16b are moved to the stowed position.

Connected to each brackets 12a, 12b is one of two actuators 22a, 22b that have a bi-directional motor. The actuators 22a, 22b each connect to one end one of two links 31a, 31b. FIGS. 7-9 show the details of the link 31b and the connection with the carrier 16b and bracket 12 and actuator 22b which are shown on the right side of the active rear diffuser 10 shown in FIG. 1. It is now understood that the structures shown in FIGS. 7-10 are the mirror images of the left side of the active rear diffuser assembly 10 shown in FIG. 1, which includes the connection of link 31a, carrier 16a, and bracket 12a. Accordingly, what applies to the right side also applies to the left side without repetition. Each of the links 31a, 31b is connected between one of the two actuators 22a, 22b and to one of two carriers 16a, 16b. When the actuators 22a, 22b are activated the links 31a, pivot and move the carriers 16a, 16b along the respective one of the two rails 18a, 18b.

Each of the two links 31a, 31b include a driven link 70a, 70b pivotally connected at a first end to a respective one of the two brackets 12a, 12b and actuators 22a, 22b. FIG. 9 shows a torsion rod 72 that connects to the actuator 22b, extends through bracket 12b and through a first end 74 of driven link 70b. The same connection is present between actuator 22a, bracket 12a and driven link 70a. The actuators 22a, 22b turn the respective torsion rod to cause the driven link 70a, 70b to pivot. A second end 76a, 76b of the driven links 70a, 70b pivotally connects to a first end of a respective one of two moveable links 33a, 33b. A respective second end 35a, 35b of each of the moveable links 33a, 33b is pivotally connected to the respective one of the two carriers 16a, 16b. Activation of the actuators 22a, 22b in a first direction to cause the moveable links 33a, 33b to push the respective one of the carriers 16a, 16b and a cover 38 (described in more detail below) to the extended position (shown in FIG. 1). Activation of the at least one actuator in a second direction causes the moveable link 33a, 33b to pull the respective one of the two carriers 16a, 16b and the cover 38 to the stowed position (shown in FIG. 2).

Connected to the carriers 16a, 16b is a base 24 that is formed of a left section 26a, middle section 26b, and right section 26c (also referred to collectively as "sections 26a, 26b, 26c"). The sections 26a, 26b, 26c are produced by extrusion and having a selected length. Producing sections 26a, 26b, 26c of the base 24 by extrusion allows it to have any desired selected length, thereby contributing to the modularity and scalability of the invention since vehicles have different widths, thereby allowing the active rear diffuser assembly to be sized to any width of vehicle platform. The middle section 26c is connected between the carriers 16a, 16b using fasteners, adhesives, or other suitable connection mechanisms. The left section 26a is connected to the carrier 16a using fasteners, adhesives, or other suitable connection mechanism. The right section 26c is connected to the carrier 16b using fasteners, adhesives, or other suitable connection mechanism.

Figure 2:
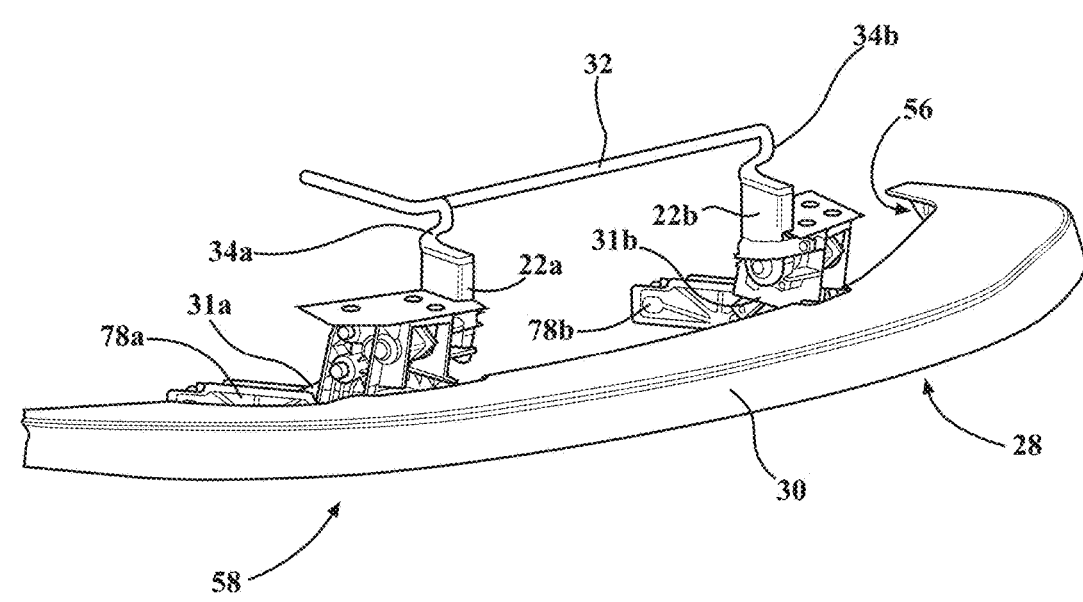
FIG. 2 is a top perspective view of an active rear diffuser assembly with a cover connected.

Referring now to FIG. 2 the active rear diffuser assembly 10 is shown with a cover 28 connected to the base 24. The cover 28 has an exterior surface 30 that in some embodiments has a Class A finish surface, while in other embodiments has a different finish depending on the desired aesthetics of the application. The term "Class A finish surface" as used herein is defined any surface of a vehicle that has styling intent, that is either seen, touched, or both and mathematically has a surface with curvature and tangency alignment. A Class A finish surface as used herein also includes any generally accepted measurable physical features that are agreed to represent a Class A finish surface in the field of automotive design. Also depicted in FIG. 2 is a wiring harness 32 that has a first connector 34a connected to actuator 22a and a second connector 34b connected to actuator 22b. The wiring harness 32 provides power to each actuator 22a, 22b of the active rear diffuser assembly 10.

Referring now to FIGS. 1-4, the sections 26a, 26b, 26c of the base 24 each have closed channels 36a, 36b that extend through the length of the sections 26a, 26b, 26c which add strength and lowering weight of the base 24 by forming a closed box structure, while also providing a space for the placement of other structures such as hoses, wires, actuator mounts, etc. While two closed channels 36a, 36b are shown it is within the scope of this invention for a greater or lesser number of channels to be present. Referring also to FIGS. 9-12 the closed channel 36a as shown also receives inner connection posts 80a, 80b or outer connection posts 82a, 82b extending from the carriers 16a, 16b. The inner posts 80a, 80b and outer posts 82a, 82b have apertures for receiving fasteners that are used to connect the sections 26a, 26b, 26c to the carriers 16a, 16b. Alternatively, adhesives can be applied or welds created between the inner surface of the closed channel 36a and the inner connection posts 80a, 80b or outer connection posts 82a, 82b. The inner connection posts 80a, 80b are used connect the opposing ends of section 26b between carriers 16a, 16b. The outer connection post 82a is used to connect section 26a to the carrier 16a. The outer connection post 82b is used to connect section 26c to carrier 16b.

Figure 3:
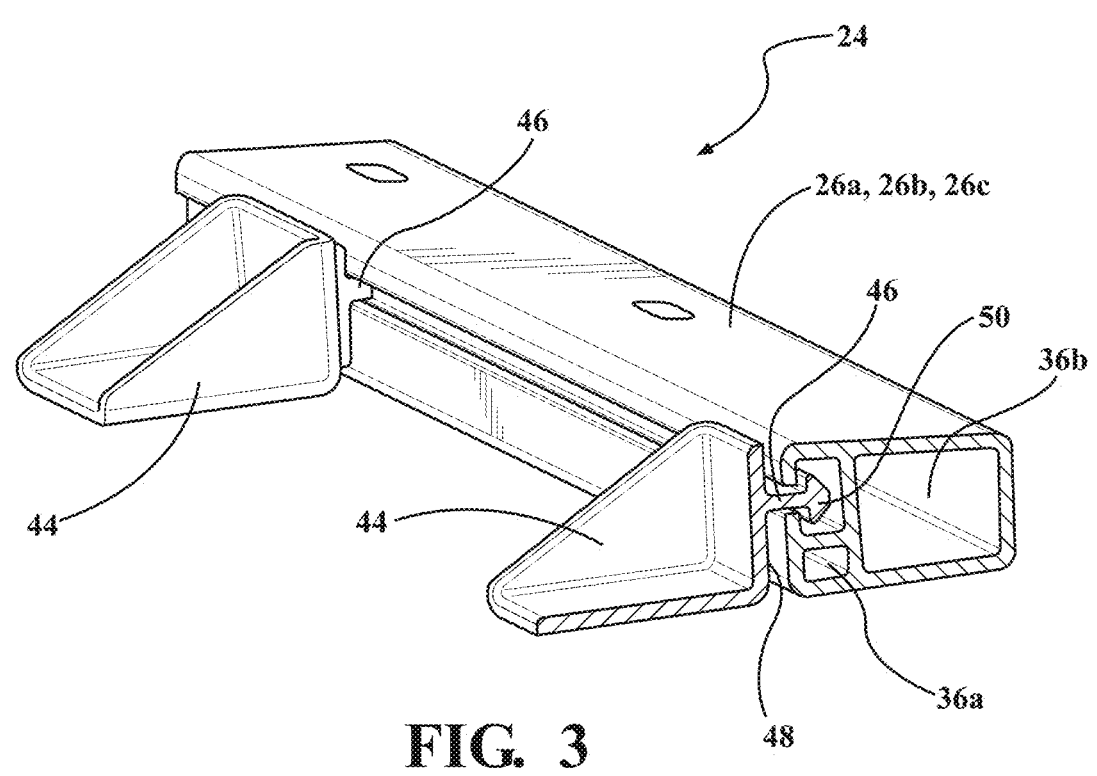
FIG. 3 is a side perspective cross-sectional view taken about section line 3-3 in FIG. 4.
Figure 4:
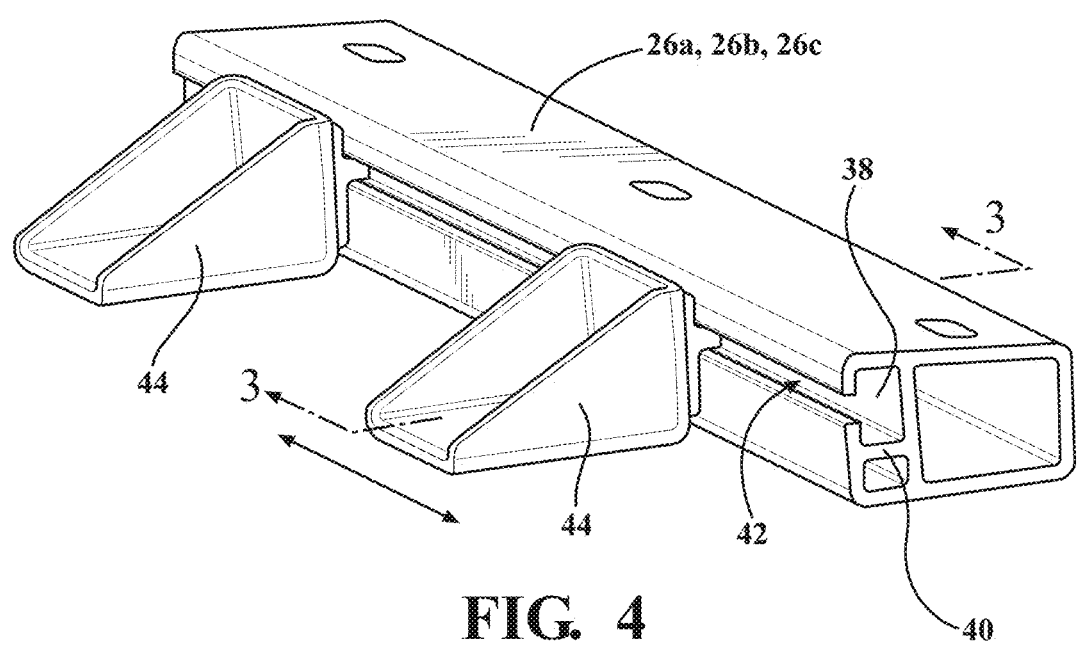
FIG. 4 is a side perspective view of the sections of the base of the active rear diffuser assembly.
Figures 5, 6:
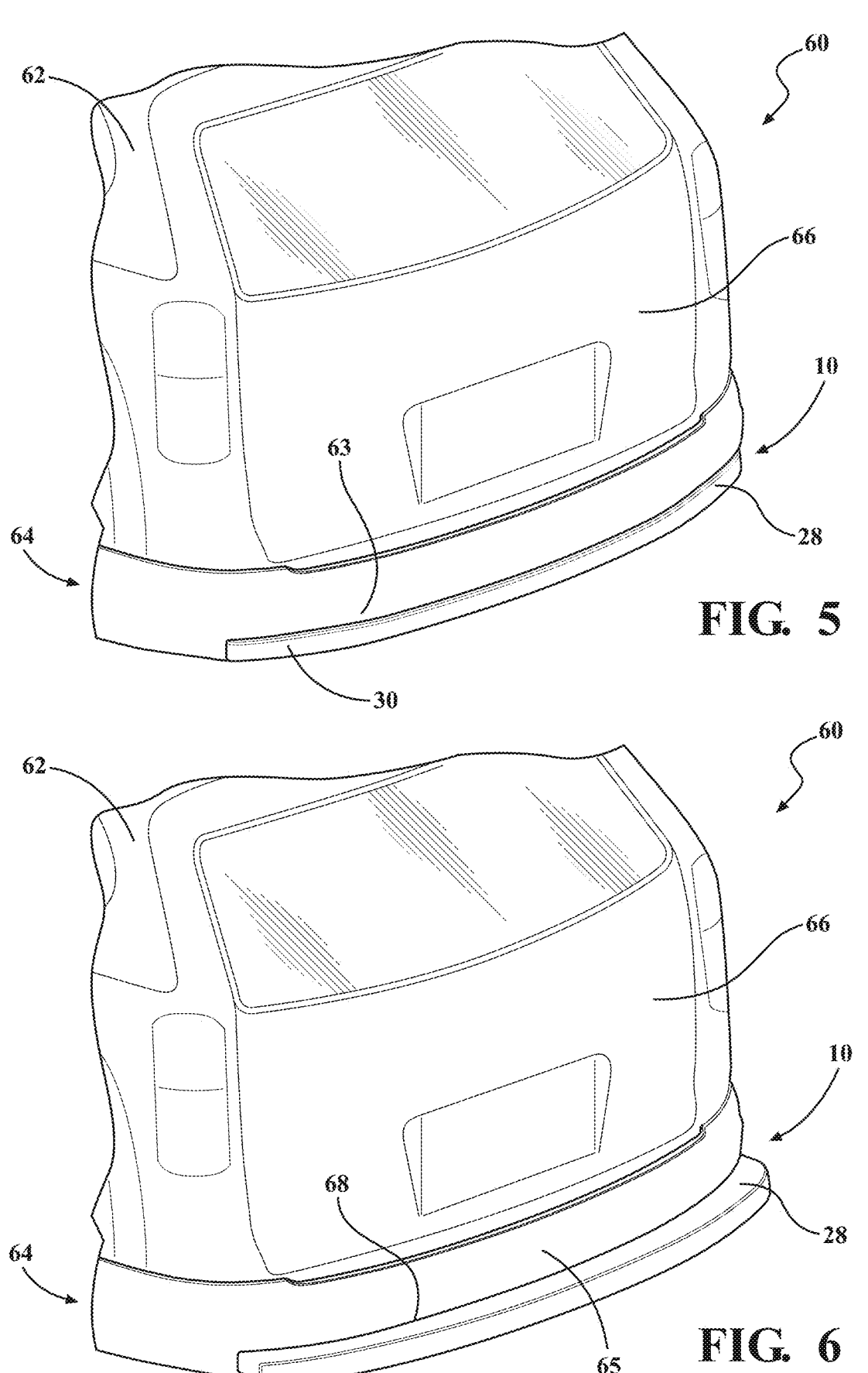
FIG. 5 is a rear perspective view of a vehicle with the active rear diffuser in the retracted position.
FIG. 6 is a rear perspective view of the vehicle with the active rear diffuser in the extended position.

Each of the sections 26a, 26b, 26c further include an open channel 38 that extends along the length of one side of each of the sections 26a, 26b, 26c. The open channel 38 has an end opening 40 and side opening 42 that allows for the attachment of components to the open channel 38. As shown in FIGS. 1, 3 and 4 there are several cover supports 44 each having a stem 46 that extends from a connection surface 48 of the cover support 44 and terminates at a knob 50. Each cover support 44 connects to the open channel 38 by sliding the knob 50 into the end opening 40 of the open channel 38 so that the stem 46 extends through the side opening 42 and the knob 50 then holds the respective cover support 44 in place along the open channel 38. Each cover support 44 can be moved along the length of the open channel 38 by sliding the cover support 44 to the desired position. The cover support 44 is then frictionally held in place by the knob 50, however, it is within the scope of the invention to use fasteners, adhesives, or welding to more permanently lock the cover support 44 into place along the length of the base 24.

Each cover support 44 include a bottom surface 52 and two angled surfaces 54a, 54b contact an inside surface 56 of the cover 28. During assembly the cover 28 is connected to the base 24 and each cover support 44. The connection between the cover 28, the base 24 and each cover support 44 is accomplished using variety of mechanisms including snap fittings, adhesives, welding, and fasteners depending on the design requirements. The cover 28 is usually thin and sometimes has flexibility that requires the cover 28 to be supported on the backside. Also, since a lot of the air flow comes from the bottom of the vehicle the bottom surface 52 provides support along a bottom side 58 of the cover 28 to minimize wind deflection. While FIG. 1 shows a total of eight cover supports 44, it is within the scope of this invention for a greater or lesser number of cover supports to be used depending on the size and shape of the cover 28.

What is claimed is:

1. An active rear diffuser assembly comprising:
    a base produced by extrusion, wherein the base has at least one closed channel extending through the base;
    at least one rail;
    at least one carrier connected to the at least one base and the at least one rail, wherein the at least one carrier and base move on the at least one rail between a stowed position and an extended position;
    at least one actuator connected to the at least one carrier for providing power to move the at least one carrier on the at least one rail; and
    a cover connected to the base, wherein the cover moves between the stowed position and the extended position.

2. The active rear diffuser assembly of claim 1 wherein the cover has an exterior surface with a Class A finish surface.

3. The active rear diffuser assembly of claim 1 further comprising:
    a rear fascia of a vehicle having an external surface and an inside surface opposite the external surface, wherein the at least one rail, the at least one carrier and the at least one actuator are positioned behind the rear fascia and adjacent the inside surface of the rear fascia, and the base and the cover are extendable past the external surface of the rear fascia when the base and the cover are moved to the extended position.

4. The active rear diffuser assembly of claim 3 wherein the rear fascia further comprises an aperture extending from the external surface of the rear fascia to the inside surface of the rear fascia, wherein the cover is configured to slide through the aperture between the stowed position and the extended position, wherein the exterior surface of the cover is adjacent the exterior surface of the rear fascia when the cover is in the stowed position.

5. The active rear diffuser assembly of claim 1 further comprising:
    at least one cover support connected to the base and the cover for strengthening the cover.

6. The active rear diffuser assembly of claim 5 further comprising
    an open channel formed in the base, wherein the open channel has a side opening;
    wherein each of the at least one cover support has a connection surface with a stem extending therefrom and terminating at a knob, wherein the knob is positioned within the open channel and the stem extends through the side opening thereby connecting the at least one cover support to the base.

7. The active rear diffuser assembly of claim 5 wherein the at least one cover support has a bottom surface and at least one angled surface extending from the bottom surface.

8. The active rear diffuser of claim 1 further comprising:
   a track formed on the at least one rail and a slidable connection between the track and the at least one carrier;
   a retainer connected to the at least one carrier and the at least one rail, wherein the retainer has at least one post slidably positioned in the track allowing the retainer to slide with the at least one carrier along the track between the stowed position and the extended position.

9. The active rear diffuser assembly of claim 8 further comprising:
   a channel portion formed on the at least one carrier for receiving at least a portion of the at least one rail when the at least one carrier is moved to the stowed position.

10. The active rear diffuser assembly of claim 1 further comprising:
    a link connected between the at least one actuator and the at least one carrier, wherein the at least one actuator causes the link to pivot and move the at least one carrier along the at least one rail.

11. The active rear diffuser assembly of claim 10 further comprising:
    at least one bracket, wherein the at least one actuator is connected to the at least one bracket;
    wherein the link includes a driven link pivotally connected at a first end to the at least one bracket and the at least one actuator, and
    a moveable link having a first end pivotally connected to a second end of the driven link, and a second end of the moveable link pivotally connected to the at least one carrier, wherein activation of the at least one actuator in a first direction to cause the moveable link to push the at least one carrier and the cover to the extended position and activation of the at least one actuator in a second direction causes the moveable link to pull the at least one carrier and cover to the stowed position.

12. The active rear diffuser assembly of claim 1 wherein an aerodynamic support connects below a rear bumper of the vehicle.

13. An active rear diffuser assembly comprising:
    a base produced by extrusion, wherein the base has at least one closed channel extending through the base;
    at least one rail;
    at least one carrier connected to the at least one base and the at least one rail, wherein the at least one carrier and base move on the at least one rail between a stowed position and an extended position, and
    a cover connected to the base, wherein the cover moves between the stowed position and the extended position.

14. The active rear diffuser assembly of claim 13 wherein the cover has an exterior surface with a Class A finish surface.

15. The active rear diffuser assembly of claim 13 further comprising:
    a rear fascia of a vehicle having an external surface and an inside surface opposite the external surface, wherein the at least one rail and the at least one carrier are positioned behind the rear fascia and adjacent the inside surface of the rear fascia, and the base and the cover are extendable past the external surface of the rear fascia when the base and the cover are moved to the extended position.

16. The active rear diffuser assembly of claim 15 wherein the rear fascia further comprises an aperture extending from the external surface of the rear fascia to the inside surface of the rear fascia, wherein the cover is configured to slide through the aperture between the stowed position and the extended position, wherein the exterior surface of the cover is adjacent the exterior surface of the rear fascia when the cover is in the stowed position.

17. The active rear diffuser assembly of claim 13 further comprising:
    at least one cover support connected to the base and the cover for strengthening the cover.

18. The active rear diffuser assembly of claim 17 further comprising
    an open channel formed in the base, wherein the open channel has a side opening;
    wherein the at least one cover support has a connection surface with a stem extending therefrom and terminating at a knob, wherein the knob is positioned within the open channel and the stem extends through the side opening thereby connecting the at least one cover support to the base.

19. The active rear diffuser assembly of claim 17 wherein the at least one cover support has a bottom surface and at least one angled surface extending from the bottom surface.

20. The active rear diffuser of claim 13 further comprising:
    a track formed on the at least one rail and a slidable connection between the track and the at least one carrier;
    a retainer connected to the at least one carrier and the at least one rail, wherein the retainer has at least one post slidably positioned in the track allowing the retainer to slide with the at least one carrier along the track between the stowed position and the extended position.

21. The active rear diffuser assembly of claim 20 further comprising:
    a channel portion formed on the at least one carrier for receiving at least a portion of the at least one rail when the at least one carrier is moved to the stowed position.

22. The active rear diffuser assembly of claim 13 wherein an aerodynamic support connects below a rear bumper of the vehicle.

* * * * *